(12) United States Patent
Tietsch

(10) Patent No.: US 8,015,150 B2
(45) Date of Patent: Sep. 6, 2011

(54) METHOD FOR EDITING RELATED DATA IN A DATABASE

(75) Inventor: Michael Tietsch, Kaufering (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 390 days.

(21) Appl. No.: 12/283,017

(22) Filed: Sep. 9, 2008

(65) Prior Publication Data

US 2009/0070393 A1    Mar. 12, 2009

(30) Foreign Application Priority Data

Sep. 11, 2007    (EP) .................................... 07017800

(51) Int. Cl.
*G06F 7/00*    (2006.01)
*G06F 17/00*    (2006.01)
(52) U.S. Cl. ....................... 707/610; 707/615
(58) Field of Classification Search ........................ None
See application file for complete search history.

(56) References Cited

U.S. PATENT DOCUMENTS

| 6,058,391 | A | * | 5/2000 | Gardner | ................................. 1/1 |
| 6,070,165 | A | * | 5/2000 | Whitmore | ............................. 1/1 |
| 6,711,593 | B1 | * | 3/2004 | Gordon et al. | ................. 707/615 |

* cited by examiner

*Primary Examiner* — Pierre Vital
*Assistant Examiner* — Loan T Nguyen

(57) ABSTRACT

In one aspect, a method for operating databases with a plurality of first data is provided. A temporary copy of at least some logically related parts of the plurality of first data is generated as second data for an editing procedure. The second data is offered by a user such that he can edit the second data. On conclusion of the editing procedure an individual comparison of the second data with the first data is performed such that when a second datum of the second data matches a first datum of the first data, a reference is created in the database to the first datum corresponding to the second datum. At least some of the second data for which no match with first data is determined is saved in the database.

19 Claims, 1 Drawing Sheet

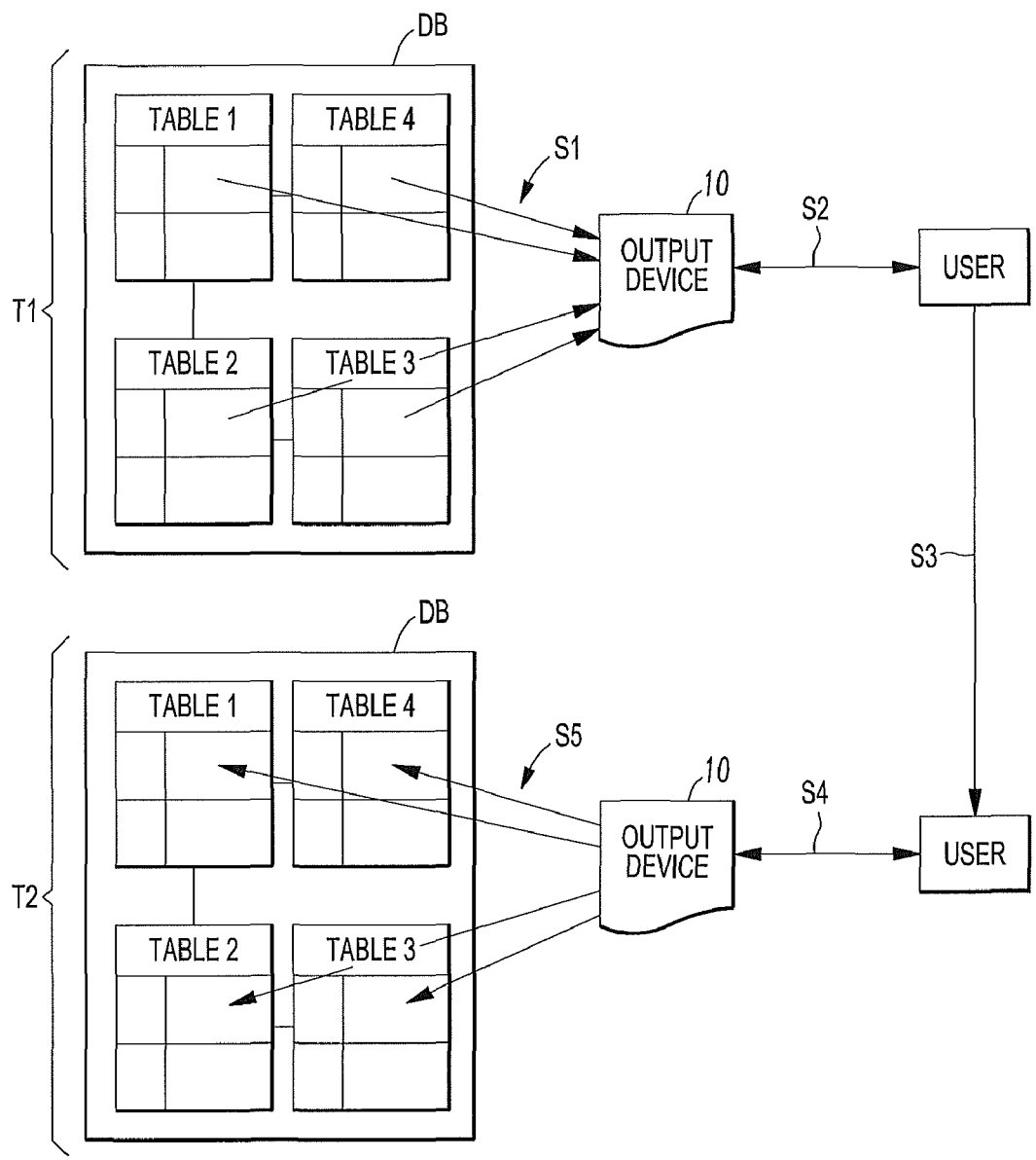

METHOD FOR EDITING RELATED DATA IN A DATABASE

CROSS REFERENCE TO RELATED APPLICATIONS

This application claims priority of European Patent Office application No. 07017800.9 EP filed Sep. 11, 2007, which is incorporated by reference herein in its entirety.

FIELD OF INVENTION

The invention relates to a method for operating databases.

BACKGROUND OF INVENTION

The use of databases to hold structured saved data has long been known. The contents of these databases, in other words the saved data, are generally accessed either in order merely to display the contents or else to edit the contents. Generally these stored data can be edited.

SUMMARY OF INVENTION

Besides these accesses to edit or simply to view existing database entries, it is also necessary to insert new elements, if appropriate taking existing entries as a template, i.e. initially copying them.

This procedure is moreover made difficult by the lack of an overview when using entries copied from several tables (as a basis for new entries), since these entries are then retained even if no change whatsoever was made, thereby destroying the principle of absence of redundancy.

A further disadvantage of such databases is that because these data generally originate from many different tables, editing the data is very costly and prone to error.

In relational databases with complex structures this disadvantage is increased exponentially, since it is repeatedly necessary to edit whole tree structures there.

The object underlying the invention consists of specifying a method and an arrangement which permit better editing of databases.

This object is achieved on the basis of the independent claims.

The inventive method to operate databases with a plurality of first data is characterized in that a) a temporary copy of at least some logically related parts of the plurality of first data is generated as second data for an editing procedure, b) the second data is offered by a user such that he can edit the second data, c) on conclusion of the editing procedure an individual comparison of the second data with the first data is performed such that c1) if a second datum of the second data matches a first datum of the first data, a reference is created in the database to the first datum corresponding to the second datum, c2) at least some of the second data for which no match with first data is determined is saved in the database.

As a result redundancies are avoided, since only edited parts of a database dump are eligible to be saved in the database. This advantage is particularly reinforced during generation of new entries by copying parts of the database inventory as a template. The inventive method also makes it possible to work with data from the database without knowing the structure of the database precisely, since the necessary data can be taken from—different parts of—the database and displayed to the user for editing as a copy containing these parts combined.

If in this case the save operation takes place as a function of information characterizing the data assigned to at least one part of the data, other opportunities present themselves to influence the save process, in particular because specific decisions are made as a result of the information, which can be useful in particular when automating the procedure and thus further removes the burden on the user, the automation in turn reducing the likelihood of errors because of user entries.

Preferably the characterizing information is embodied as an attribute such that it indicates a significance of the relevant datum that can be fixed as a value. As a result, the importance of a change of the datum can be specified for every datum.

If a user query is performed in the event that a low-significance first datum of the first data is individually compared with a second datum and no match is present, such that the save operation takes place as a function of a user entry following the query, and in the event that the individual comparison of the high-significance first datum of the first data with the second datum takes place, a user query is not saved in the database, then a—for example—detailed synchronization of the contents to be saved can be offered and for example low-significance data, as can be found for example in comment fields, are offered to the user for revision.

If a save operation occurs such that the respective first datum is overwritten by the second datum in a memory assigned to the database, existing data in the database can be updated with new contents, whereas if the save operation takes place such that the respective second data is written as a new first datum in a memory assigned to the database, an opportunity is created, especially on the basis of existing data already used as a template, to generate new data.

The individual comparison is preferably triggered by a user entry, especially the initiation of the save operation for the second data, since at this time the editing procedure can be regarded as concluded, or the user's desire to save the data correlates with the triggering of the save operation.

If the scope of the part of the logically related data is formed on the basis of a user entry, the user can determine the "root", the scope and/or the composition of the database dump, so that flexibility in editing is increased.

Preferably a relational database is involved.

BRIEF DESCRIPTION OF THE DRAWINGS

Other advantages and details of the invention are explained in greater detail on the basis of the exemplary embodiment shown in the single FIGURE. The FIGURE shows a diagrammatic illustration of an exemplary embodiment of the inventive method.

DETAILED DESCRIPTION OF INVENTION

Identifiable in the FIGURE is a database DB which for example can be a relational database at a first time T1, at which the inventive method has not yet been brought into use.

The database DB is further illustrated at a second time T2, after the inventive steps have been applied.

The contents of the database DB are also shown in diagrammatic form as tables 1 to 4 having relationships.

If a user now wishes to edit elements of the database DB, for example in connection with a document accommodating these elements, these elements are copied together in a first step S1 from the respective tables of the database DB into a local temporary copy, i.e. displayed on a screen or output device 10.

In a second step S2 the user now edits this temporary virtual document, so that on completion of his editing he triggers a save operation for the document in a third stage S3, which in a fourth stage S4 initiates a data integration to be performed in accordance with the invention.

This data integration involves temporary data being compared with those in the database DB, a development being possible whereby significance attributes can likewise be taken into account. In detail a check is made to see whether there are differences between the data. If there are, the temporary copy is rejected and a reference link to the original datum (element) is set in the relational database.

Further, if the comparison shows that high-significance data are identical and differences exist only in fields of the low-significance tables, an output to the user is generated, asking him to decide whether his change should now be included in the database DB or whether it should be rejected and a link to the original element inserted instead.

As a third partial step, a change takes place during the check if high-significance data are different, to the effect that the virtual data are included without any query in the database DB.

An alternative or addition not shown consists in the user also amending, for example generalizing, the field characterized as having low significance and already saved in the database, such as for example a field provided for comments, so that it corresponds both to the original and to the new purpose. Thus the following three cases are covered according to the invention:
  a) reject new text (text already saved remains unaltered)
  b) save new text (in addition to that already saved) and
  c) modify text already saved, whereby although this has a retroactive effect on an existing entry, it prevents unnecessary redundancy according to the invention if used expediently.

In essence, a new function in the editing of databases is thus implemented with the inventive method, which could be designated as a "Derive And Re-integrate" (DAR) function.

This function is characterized according to the invention in that it temporarily copies a complete tree to be edited, which is based on a "root" (i.e. derived) selected for example by a user.

This selected extract from the contents, also called a database dump, can then advantageously be displayed, arising from the invention, as a simple text document or as a form, so that the user can make changes or additions in the necessary places and as soon as he is finished can save the document in the normal way.

Selecting the save option then starts the final re-integration of the data in accordance with the function arising from the invention and the copied and if appropriate modified database entries are compared with the originals. Another essential point of the invention is that thus as a result of these comparison procedures (for each DB entity):

If a datum (element) has not been changed, a link to the original of the datum is created, the copy being deleted.

If a change has been made the edited copy of the datum is retained.

A further development of the inventive method that can expand this new function is if the data fields are assigned another attribute which states the significance of the respective datum and is evaluated at the time of re-integration.

Thus it is conceivable that a field has the attribute that for re-integration it must match the entry present in the database DB 100%, for example a field containing a technical attribute.

It is further conceivable that other fields, for example comments, are offered for revision if two data records differ only in this respect.

The invention thus both offers advantages for the user—for example that the attributes of the database DB, such as tables and links—(can) remain hidden and the operator edits the data as it were "flat", i.e. without having to worry about the underlying structures—as well as advantages for the database DB, i.e. for its structure, as redundancies are avoided, so that inconsistencies between "almost identical" entries are avoided.

The invention claimed is:

1. A method for operating a database having a plurality of first data, comprising:
   generating a second data, the second data comprising a temporary copy of the first data, the second data having a significance attribute and the first data having an integration attribute;
   editing the second data;
   comparing the first data and the edited second data;
   creating a link to the first data in the database if the edited second data matches the first data if the significance value of the edited second data meets the integration attribute of the first data, the link corresponding to the first data;
   saving the edited second data in the database if the edited second data does not match the first data and if the significance attribute of the edited second data meets the integration attribute of the first data;
   wherein the significance attribute is a fixed value defining a significance of the second data relative to other portions of the database;
   wherein the integration attribute comprises a condition defining a saveability of the edited second data;
   wherein the condition defining the saveability of the edited second data comprises a predetermined value and if the significance attribute of the edited second data is below the predetermined value, the edited second data has a low significance and is saveable;
   wherein if the significance attribute of the edited second data is above the predetermined value, the edited second data has a high significance and is not saveable; and
   generating an output to a user if a first portion of the edited second data that has a high significance value matches the first data and if a second portion of the edited second data that has a low significance value does not match the first data, the output allowing the user to decide whether to insert the edited second data that does not match the first data into the database or to provide a link to the first data, wherein the link is in the database.

2. The method of claim 1 wherein the fixed value of the significance attribute of the second data is a value that defines the significance as being low or high relative to other portions of the database.

3. The method of claim 1 wherein saving the edited second data in the database is initiated by the user.

4. The method of claim 1 wherein saving the edited second data in the database comprises overwriting at least one portion of the first data with the edited second data that does not match the first data.

5. The method of claim 1 wherein if the user decides to insert the edited second data, at least one portion of the first data is overwritten with the edited second data that does not match the first data.

6. The method of claim 1 further comprising the user specifying the significance attribute of the second data and the user specifying the integration attribute of the first data.

7. The method of claim 1 wherein saving the edited second data in the database comprises adding the edited second data that does not match the first data to the first data in the database.

8. The method of claim 1 further comprising deleting the edited second data that matches the first data.

9. The method of claim 2 wherein the edited second data comprises a field provided for comments and the edited second data has a low significance value.

10. The method of claim 1, wherein the database comprises a relational database.

11. The method of claim 1 wherein the fixed value of the significance attribute comprises a high fixed value that indicates that the second data has the high significance.

12. The method of claim 1 wherein the fixed value of the significance attribute comprises a low fixed value that indicates that the second data has the low significance.

13. The method of claim 1 wherein the first data comprises a plurality of portions of the database and wherein each one of the plurality of portions of the database are different.

14. The method of claim 1 wherein the second data comprises a simple text document or a form document.

15. A method for adapting a database stored in a non-transitory computer readable memory device, comprising:
   querying the database, the querying step creating a plurality of data comprising a temporary copy of at least one portion of the database;
   editing the plurality of data;
   comparing the edited plurality of data and the at least one portion of the database;
   attempting to save the edited plurality of data in the database;
   offering an opportunity to revise the edited plurality of data if there is no match between the edited plurality of data and the at least one portion of the database having a low significance attribute indicating the at least one portion of the database is of low significance relative to other portions of the database;
   wherein if the edited plurality of data and the at least one portion of the database do not match and the at least one portion of the database has a high significance attribute indicating the at least one portion of the database is of high significance relative to other portions of the database, the edited plurality of data is not saved in the database;
   wherein the low significance attribute is represented by a first fixed value;
   wherein the high significance attribute is represented by a second fixed value, the second fixed value being higher or lower than the first fixed value;
   wherein the offering the opportunity to revise the edited plurality of data comprises offering an opportunity to include the edited plurality of data in the database or rejecting the edited plurality of data and placing a link in the database, the link corresponding to the at least one portion of the database.

16. The method of claim 14 further comprising saving the edited plurality of data in the database following offering the opportunity to revise the plurality of data.

17. The method of claim 16 wherein saving the edited plurality of data in the database comprises overwriting the at least one portion of the database with the edited plurality of data that does not match the at least one portion of the database.

18. The method of claim 16 wherein saving the edited plurality of data in the database comprises adding the edited plurality of data that does not match the at least one portion of the database to the database.

19. The method of claim 14 further comprising a user specifying the low significance attribute of the at least one portion of the database and the user specifying the high significance attribute of the at least one portion of the database.

* * * * *